United States Patent
Bansal et al.

(10) Patent No.: US 9,871,731 B2
(45) Date of Patent: Jan. 16, 2018

(54) DATA PLANE MANIPULATION IN A LOAD BALANCER

(71) Applicant: Microsoft Technology Licensing, LLC, Redmond, WA (US)

(72) Inventors: Deepak Bansal, Sammamish, WA (US); Geoffrey Hugh Outhred, Seattle, WA (US); Narasimhan Agrahara Venkataramaiah, Redmond, WA (US); Shekhar Agarwal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/871,645

(22) Filed: Sep. 30, 2015

(65) Prior Publication Data

US 2017/0093724 A1   Mar. 30, 2017

(51) Int. Cl.
*H04L 12/26* (2006.01)
*H04L 12/803* (2013.01)
*H04L 12/24* (2006.01)
*H04L 29/08* (2006.01)

(52) U.S. Cl.
CPC ........ *H04L 47/125* (2013.01); *H04L 41/0896* (2013.01); *H04L 41/12* (2013.01); *H04L 41/147* (2013.01); *H04L 67/1002* (2013.01); *H04L 67/1008* (2013.01); *H04L 67/1023* (2013.01)

(58) Field of Classification Search
None
See application file for complete search history.

(56) References Cited

U.S. PATENT DOCUMENTS

| | | |
|---|---|---|
| 7,742,477 B1 | 6/2010 | James et al. |
| 7,933,983 B2 | 4/2011 | Doug et al. |
| 8,289,968 B1 | 10/2012 | Zhuang |
| 8,762,501 B2 | 6/2014 | James et al. |
| 8,812,729 B2 | 8/2014 | Watt et al. |
| 2010/0036903 A1 | 2/2010 | Ahmad et al. |
| 2011/0314119 A1 | 12/2011 | Kakadia et al. |
| 2012/0246637 A1 | 9/2012 | Kreeger et al. |
| 2012/0281706 A1 | 11/2012 | Agarwal et al. |
| 2013/0125124 A1 | 5/2013 | Kempf et al. |

(Continued)

OTHER PUBLICATIONS

International Search Report and Written Opinion issued in PCT Application No. PCT/US2016/053214 dated Dec. 13, 2016.

(Continued)

*Primary Examiner* — Michael J Moore, Jr.
(74) *Attorney, Agent, or Firm* — Workman Nydegger (57) ABSTRACT

A load balancer capable of adjusting how network data is distributed to a tenant or group of tenants by manipulating the data plane. The load balancer is placed directly in the flow path of network data that is destined for a tenant or group of tenants having a tenant address. The load balancer includes a control plane and one or more data planes. Each data plane may contain one or more network traffic multiplexors. Further, each data plane may be dedicated to a tenant or group of tenants. Data planes may be added or deleted from the load balancer; additionally, multiplexors may be added or deleted from a data plane. Accordingly, network data directed towards one tenant is less likely to affect the performance of load balancing performed for another tenant.

20 Claims, 9 Drawing Sheets

(56) References Cited

U.S. PATENT DOCUMENTS

| | | | |
|---|---|---|---|
| 2014/0029431 A1* | 1/2014 | Haberland | H04W 88/08 370/235 |
| 2014/0052877 A1 | 2/2014 | Mao | |
| 2014/0281021 A1 | 9/2014 | Chrysos et al. | |
| 2014/0310390 A1 | 10/2014 | Sorenson et al. | |
| 2014/0373146 A1* | 12/2014 | Murthy | H04L 63/1408 726/23 |
| 2015/0039731 A1 | 2/2015 | Madani et al. | |
| 2015/0134626 A1* | 5/2015 | Theimer | G06F 17/30289 707/693 |
| 2016/0094668 A1* | 3/2016 | Chang | H04L 67/16 709/223 |
| 2017/0034051 A1* | 2/2017 | Chanda | H04L 45/586 |

OTHER PUBLICATIONS

Patel, et al., "Ananta: Cloud Scale Load Balancing", In Proceedings of ACM SIGCOMM Computer Communication Review, vol. 43, No. 4, Aug. 12, 2013, 207-218.

"Second Written Opinion Issued in PCT Application No. PCT/US2016/053214", dated Aug. 31, 2017, 11 Pages.

* cited by examiner

DATA PLANE MANIPULATION IN A LOAD BALANCER

BACKGROUND

Many conventional networks are extremely complex and often require countless hours of maintenance and support. Often, various individual parts of the network work together to provide a more seamless end result for a user. To assist in creating this effect, networks often rely on a piece of architecture to spread work (e.g., the receipt and processing of network data) between multiple machines in an effort to not overload any individual machine. This piece of network architecture is appropriately called a load balancer. To this end, for some networks, load balancers are placed directly in the path of incoming network data for purposes of distributing the network data to various worker components in load balanced way.

Load balancers may be shared by a large number of tenants. A tenant is a collection of one or more computing entities (such as modules, components, objects, processes, procedures, functions, threads, libraries and so forth) that is/are capable of performing one or more tasks for a corresponding entity (e.g., a customer such as a business, a user, a related cluster of users, and so forth).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least one embodiment described herein relates to a system containing a load balancer. The load balancer is placed directly in a flow path of network data that is destined for a tenant or group of tenants having a tenant address. The load balancer is used to adjust a distribution of network data provided to the tenant or group of tenants. The load balancer includes a control plane and one or more data planes. Each data plane may contain one or more network traffic multiplexers ("MUXes"). Additionally, each data plane may be dedicated to a tenant or group of tenants.

Further, the adjustment of the distribution of network data includes 1) instantiating one or more data planes in the load balancer, 2) deleting one or more data planes from the load balancer, 3) adding a number of MUXes within a data plane or 4) deleting a number of MUXes from a data plane. Dedicating one or more data planes to a tenant or group of tenants helps to isolate network data routed between the tenants serviced by the load balancer. Accordingly, network data directed towards one tenant is less likely to affect the performance of load balancing performed for another tenant.

This Summary is provided to introduce a selection of concepts in a simplified form that are further described below in the Detail Description. This Summary is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered as limiting the scope of the invention, the embodiments will be described and explained with additional specificity and detail through the use of the accompanying drawings wherein.

DETAILED DESCRIPTION

At least one embodiment described herein relates to a system containing a load balancer. The load balancer is placed directly in a flow path of network data that is destined for a tenant or group of tenants having a tenant address. The load balancer is used to adjust a distribution of network data provided to the tenant or group of tenants. The load balancer includes a control plane and one or more data planes. Each data plane may contain one or more network traffic multiplexers ("MUXes"). Additionally, each data plane may be dedicated to a tenant or group of tenants.

Further, the adjustment of the distribution of network data includes 1) instantiating one or more data planes in the load balancer, 2) deleting one or more data planes from the load balancer, 3) adding a number of MUXes within a data plane or 4) deleting a number of MUXes from a data plane. Dedicating one or more data planes to a tenant or group of tenants helps to isolate network data routed between the tenants serviced by the load balancer. Accordingly, network data directed towards one tenant is less likely to affect the performance of load balancing performed for another tenant.

In accordance with embodiments illustrated herein, a load balancer that is capable of providing isolation between packets of network data which are passing through that load balancer will be described. First, a computing system in which some of the embodiments described herein will be introduced. Next, a high level description of the functionality of a load balancer will be introduced using FIGS. 2 and 3. Following that description, a detailed description of the structure and functionality of a load balancer, including its components, will be shown in FIGS. 4 through 8. Lastly, an example of a method will be presented in FIG. 9 in which a load balancer can be used to modify how packets of network data are distributed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
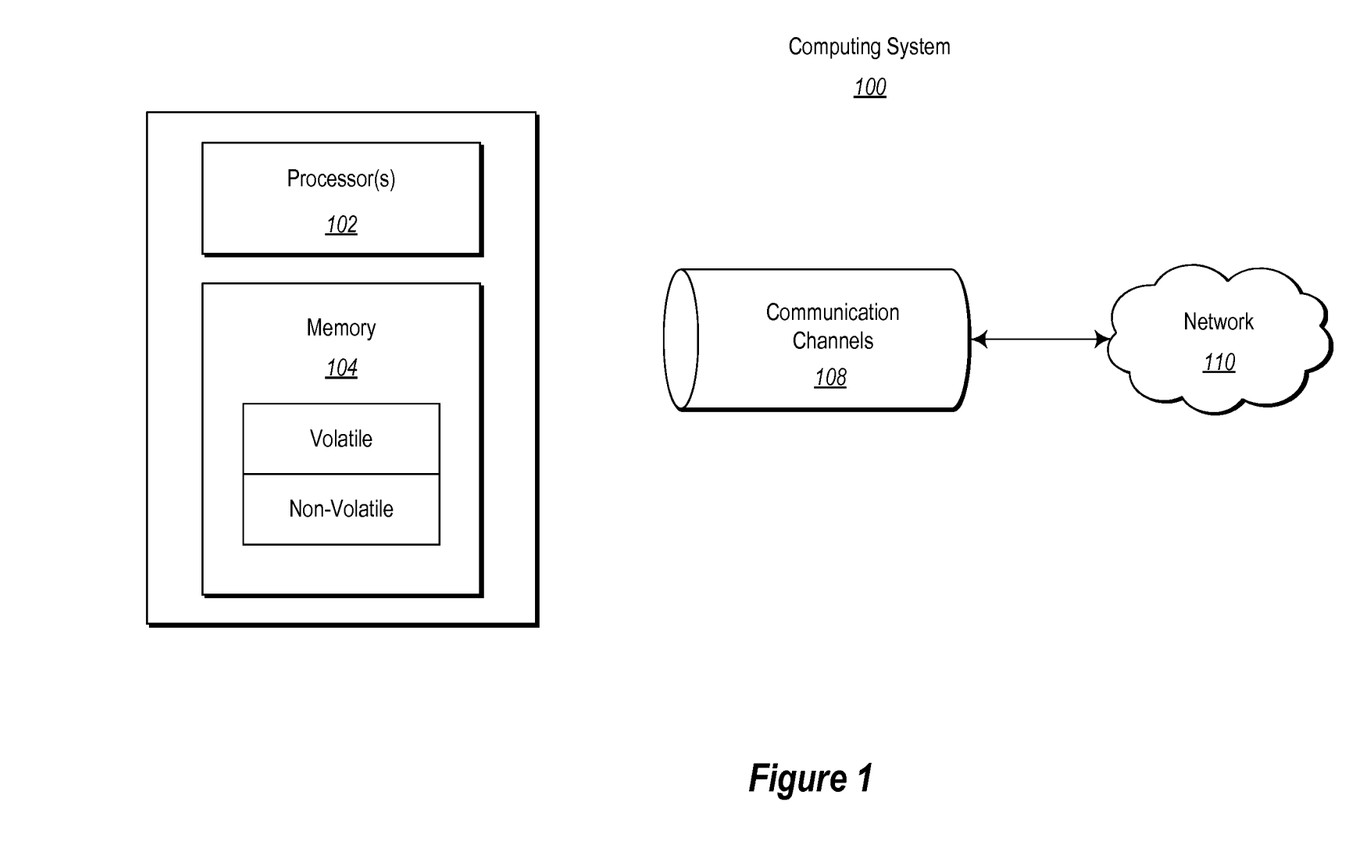
FIG. 1 illustrates a basic computing system in which some of the embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Having just described a physical computing system (an example of which being a physical machine) with respect to FIG. 1, the concept of a load balancer will now be described using FIG. 2. Nevertheless, each of the load balancers that are described in the following sections are capable of using the type of physical machine that was described in FIG. 1. On the other hand, load balancers are also capable of incorporating other types of computing devices, such as virtual devices. It follows then that load balancers are capable of using physical machines, virtual machines, or a combination thereof.

The general functionality of a load balancer will now be described with respect to FIG. 2. Specifically, FIG. 2 illustrates a load balancer 205 that is situated in a network data path. Here, the load balancer 205 is capable of routing incoming packets of network traffic to a desired location. In the case of FIG. 2, the desired location of the network data is a tenant 206. A tenant is a representation of a machine (or network of machines) that is/are controlled by a single entity and that is/are capable of performing tasks for that entity.

In one embodiment, the tenant 206 may include one or more physical machines (such as what was illustrated in FIG. 1) or the tenant 206 may include one or more virtual machines that are distributed across multiple hosts. However, in other embodiments, tenant 206 may only be a single machine. For instance, in FIG. 2, tenant 206 is shown as having four computing devices 207A through 207D that are collectively known as computing devices 207. However, the ellipses 207E are illustrated to symbolically represent that the principles described herein apply regardless of the number of physical machines that are operating for the tenant 206.

Tenant 206 is also shown as having a tenant address 204. Although FIG. 2 illustrates the load balancer 205 as providing network traffic to a single tenant 206, the principle described herein also contemplates that the load balancer 205 may perform similar functions for multiple tenants. Accordingly, the tenant address 204 helps the sources 201 route the network traffic to the load balancer 205 and helps the load balancer 205 identifier the tenant 206. Thus the tenant address 204 is used to distinctly identify tenant 206 from any other tenants (not shown in FIG. 2) that may be operating within the same network. In one embodiment, the tenant address 204 may be (or may include) a virtual IP Address ("VIP"). However, the tenant address 204 may be any other suitable addressing system.

As stated previously, tenant 206 is shown as having four computing devices 207A through 207D. In the situation presented in FIG. 2, load balancer 205 is capable of receiving network data that is addressed to tenant 206 (via the corresponding tenant address 204). After receiving the network data, load balancer 205 is then able to route that network data to one or more computing devices (e.g. computing device 207B) that are operating as part of the tenant 206. In other words, the load balancer 205 is able to distribute network data among computing devices 207 that are operating as part of a tenant 206. A person skilled in the art will recognize that a load balancer is capable of routing network data these computing devices through the use of a computing device's dedicated IP Address ("DIP") as illustrated in FIG. 2 (e.g. DIPs 208A through 208D).

Figure 2:
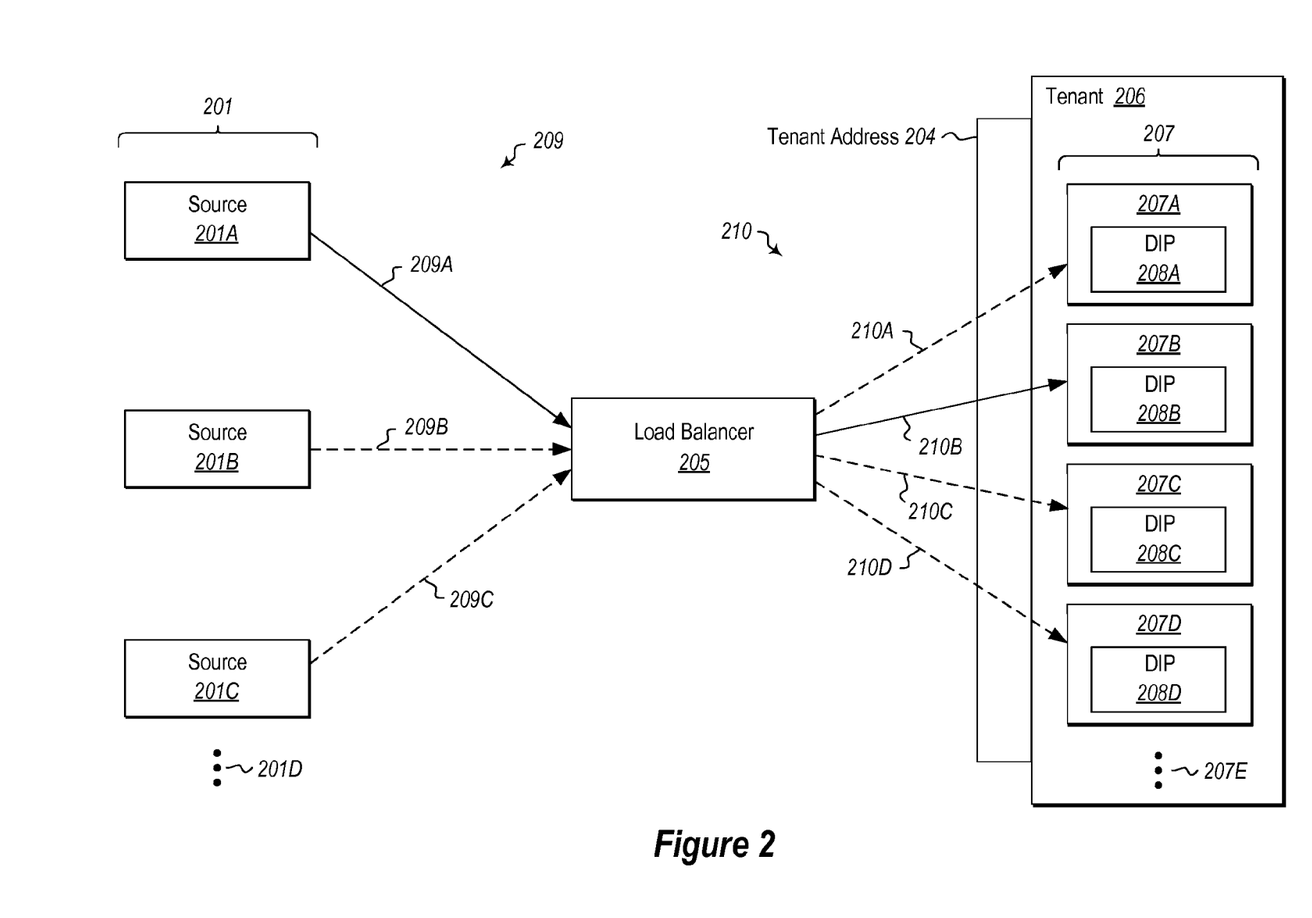
FIG. 2 illustrates a load balancer that is capable of distributing packets of network data to one or more computing devices operating as part of a tenant.

FIG. 2 also shows three sources, namely: source 201A, source 201B, and source 201C; these sources are collectively referred to as source 201. Furthermore, the ellipses 201D symbolize that the load balancer 205 may route network traffic originating from any number (and potentially large numbers) of sources to the tenant. A person skilled in the art will be able to recognize that network data has to originate from some kind of a source, and that network data is capable of being addressed to a specific location. As such, details surrounding how network data is created and how network data is addressed will not be presented herein. As an example only, the source 201 could be an edge router.

Returning to the description of the load balancer 205, the network data path within which the load balancer 205 is placed includes all flows of data from any source that the load balancer may potentially serve (as represented generally by input paths 209) to any tenant (as represented generally by output paths 210). For instance, the arrows 209A and 210B are bolded to represent one specific network data path. However, the arrows 209B, 209C, 210A, 210C and 210D are dashed to illustrate that other combinations of input paths 209 and output paths 210 may exist for a particular data flow between the sources 201 and the tenant 206.

Figure 3:
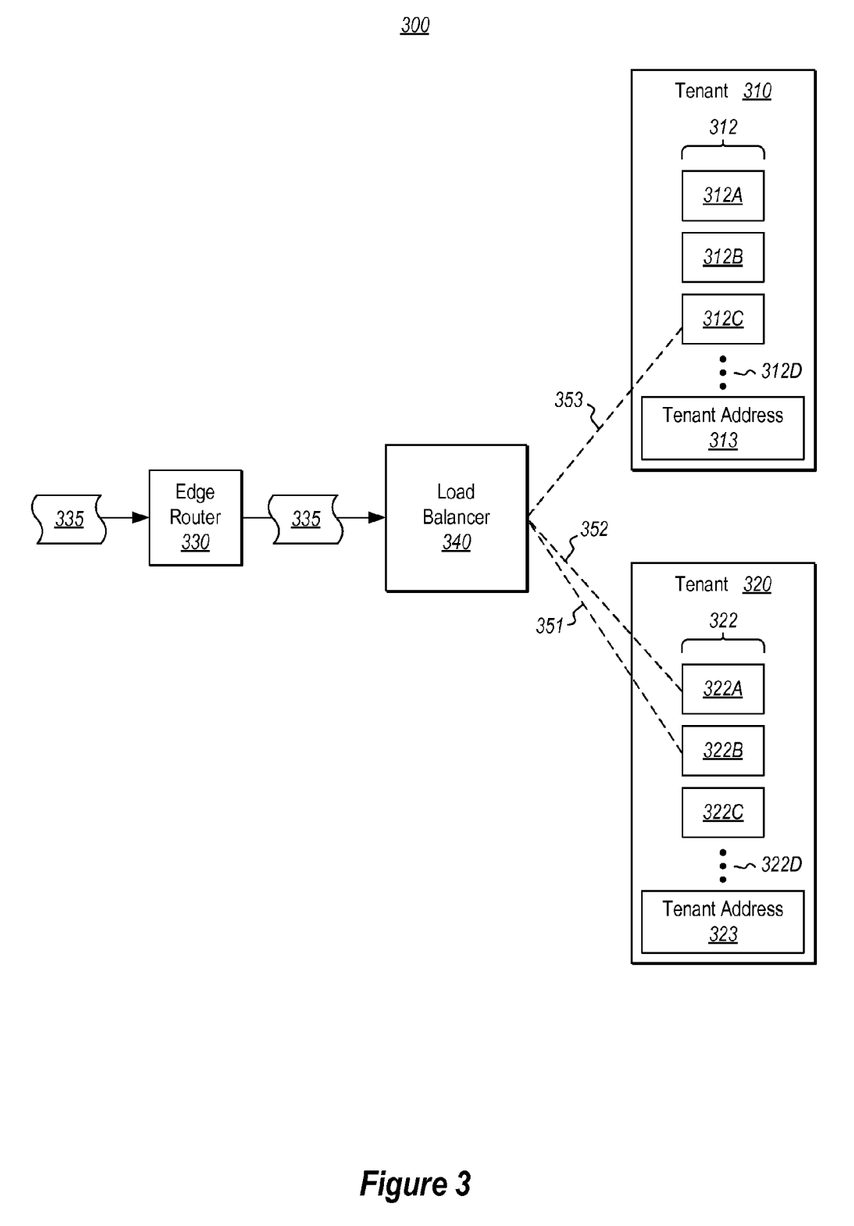
FIG. 3 illustrates a distributed environment in which a load balancer is located and in which the load balancer is capable of distributing packets of network data to one or more computing devices operating as part of a tenant.

Having just described the high level functionality of the load balancer 205 that was presented in FIG. 2, a more detailed description of the functionality of a load balancer 340 will now be described using FIG. 3. FIG. 3 illustrates a load balancer 340 that is capable of operating in a distributed system 300. In this case, load balancer 340 may be similarly configured as the load balancer 205 presented in FIG. 2. As an example, the system 300 may be implemented in, for example, a distributed cloud computing environment. In this description, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description, a "cloud computing environment" is an environment in which cloud computing is employed. Though described as residing within a cloud computing environment, the principles recounted herein are not limited only to that type of environment. As such, the embodiments described throughout may also be implemented in a native environment or another suitable environment.

Returning to FIG. 3, FIG. 3 illustrates the system 300 as having tenants 310 and 320. Tenants 310 and 320 may each likewise correspond to instances of the tenant 206 presented in FIG. 2. Also, tenants 310 and 320 are shown as each having a tenant address 313 and 323, respectively. Similar to the comparison of the tenants in FIGS. 2 and 3, the tenant addresses 313 and 323 may be likened to the tenant address 204 in FIG. 2.

Tenants 310 and 320 each have a collection of computing devices. For example, tenant 310 has three computing devices, namely: computing device 312A, computing device 312B, and computing device 312C. However, the ellipses 312D demonstrate that the number of computing devices is not limited to three. In this situation, the computing devices 312A through 312C are collectively referred to as computing devices 312. The same principle applies to tenant 320 which has computing devices 322, and thus the computing devices 322A through 322C are collectively referred to as computing devices 322. Though not shown in FIG. 3, each computing device has a DIP similar to the DIPs 208A through 208D that were presented in FIG. 2.

Generally, system 300 shows the load balancer 340 receiving network data 335. In this case, the network data 335 is shown as being intended for a tenant. Further, the network data 335 is displayed as coming from an edge router 330. In some embodiments, the Border Gateway Protocol (BGP) is used for communication between the edge router 330 and the load balancer 340, although any suitable protocol may be used. Load balancer 340 is capable of distributing the network data 335 to a set of the computing devices (e.g. computing devices 312) operating as part of a tenant. For example, as depicted in FIG. 3, if the network data 335 is destined for tenant 310, the load balancer 340 is capable of routing the network data 335 to computing device 312C (as illustrated by association 353). Alternatively, if the network data 335 is destined for tenant 320, then the load balancer 340 is capable of routing the network data 335 to computing devices 322A and/or 322B (as illustrated by association 352 and 351 respectively).

Figure 4:
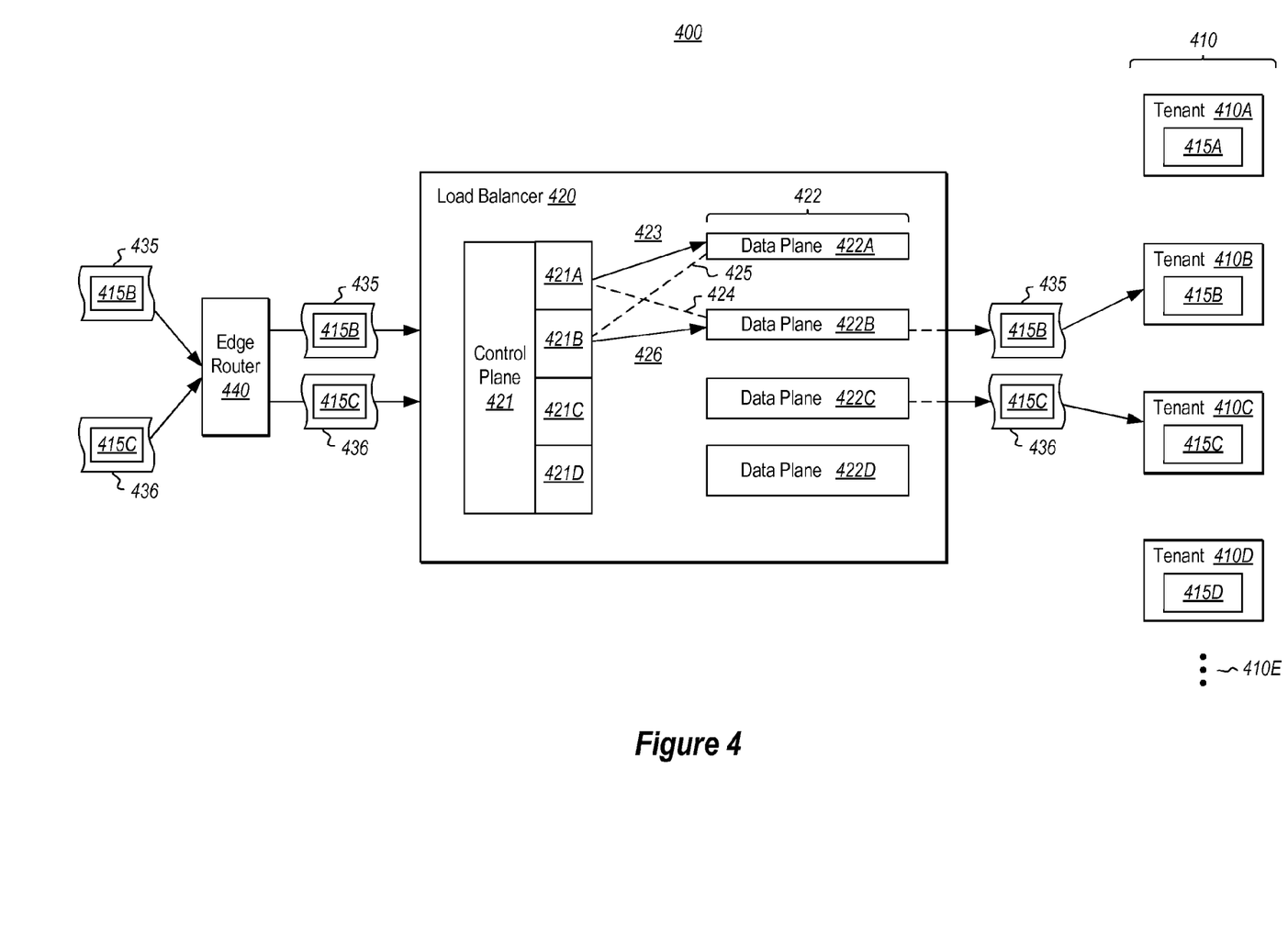
FIG. 4 illustrates a detailed view of a load balancer that is capable of isolating packets of network data that are destined for one tenant from packets of network data that are destined for a different tenant.

Having just described the functionality of load balancers with respect to FIGS. 2 and 3, the internal workings of a load balancer 420 will now be described with respect to FIG. 4. FIG. 4 shows a load balancer 420, an edge router 440, and a collection of tenants 410. Furthermore, two packets of network data 435 and 436 are illustrated in order to show example routings of network data. The objects shown in FIG. 4 may correspond to the load balancer 340, edge router 330, tenants 310, 320, and network data 335 that were previously described in FIG. 3.

The tenants 410 are illustrated as including four computing devices 410A through 410D, with potentially more as represented by ellipses 410E. Furthermore, the tenants 410A through 410D are illustrated as having corresponding tenant addresses 415A through 415D, respectively.

In the case of FIG. 4, the packets of network data 435 and 436 are shown as being addressed to tenant addresses 415B and 415C respectively. Additionally, packets 435 and 436 are shown as first being routed through the edge router 440 prior to arriving at the load balancer 420.

In this depiction, load balancer 420 has a control plane 421 and four data planes, namely: data plane 422A, data plane 422B, data plane 422C, and data plane 422D. These four data planes are collectively referred to as data planes 422. Importantly, though only four data planes are shown, load balancer 420 is not limited to that number; rather, load balancer 420 may support an adjustable number of data planes as will be described later. Along the same line, control plane 421 is shown as having four partitions, namely: partition 421A, partition 421B, partition 421C and partition 421D. Similar to the adjustable nature of the data planes, the control plane 421 is not limited to the number of partitions illustrated in FIG. 4; rather, the control plane 421 may support an adjustable number of partitions.

Figure 5:
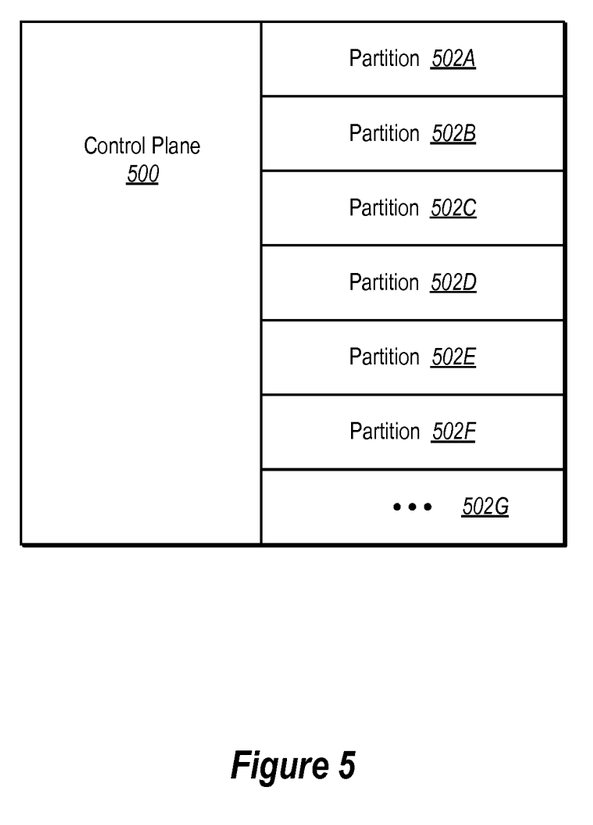
FIG. 5 illustrates a detailed view of a structure of a control plane that is capable of being partitioned into discreet units where each partitioned unit is capable of controlling the flow of network traffic through a data plane.
Figure 6:
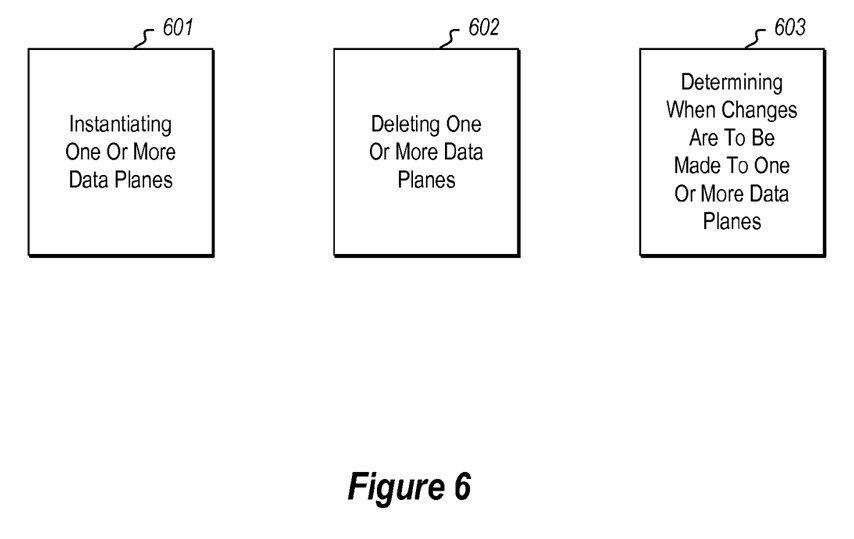
FIG. 6 illustrates the functionality that each partitioned unit of a control plane is capable of performing.

Control plane 421 will now be described in more detail using FIGS. 5 and 6. By way of introduction, FIG. 5 illustrates a detailed view of the structure of a control plane that is capable of being partitioned. FIG. 6 illustrates the functionality that each partitioned unit of a control plane is capable of performing.

As stated above, FIG. 5 illustrates the basic structure of a control plane 500. Control plane 500 may be configured in a similar manner as control plane 421 (shown in FIG. 4). Accordingly, the principles described with respect to control plane 500 may be equally applied to control plane 421. As shown, control plane 500 is similar to control plane 421 in that control plane 500 has a number of partitions. Specifically, the control plane 500 is illustrated as having partitions 502A through 502F. The ellipses 502G illustrates that control plane 500 may have more partitions than those shown.

Now that the structure of control plane 500 has been introduced, some of the functions that control plane 500 is capable of performing will be described using FIG. 6. FIG. 6 shows that control plane 500 may be configured to perform a variety of different functions. Importantly, however, each function described herein relates not only to control plane 500 as a whole, but also to each of the partitions (e.g. partition 502A). As shown in FIG. 6, control plane 500 may instantiate (act 601) one or more data planes within a load balancer. As a result of this act, the number of data planes within a load balancer is adjustable. Alternatively or in addition, control plane 500 is also capable of deleting (act 602) one or more data planes in a load balancer. Alternatively or in addition, the the control plane 500 is capable of determining (act 603) when certain changes are to be made to a data plane. Examples of these changes will be discussed in a later section.

Figure 7:
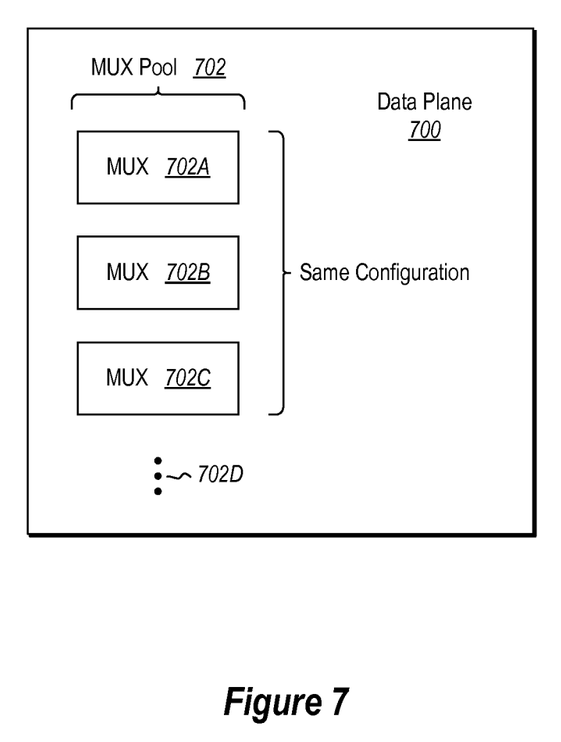
FIG. 7 illustrates a detailed view of a data plane that contains a collection of multiplexors ("MUXes") where the number of MUXes within the data plane is controlled by the control plane.
Figure 8:
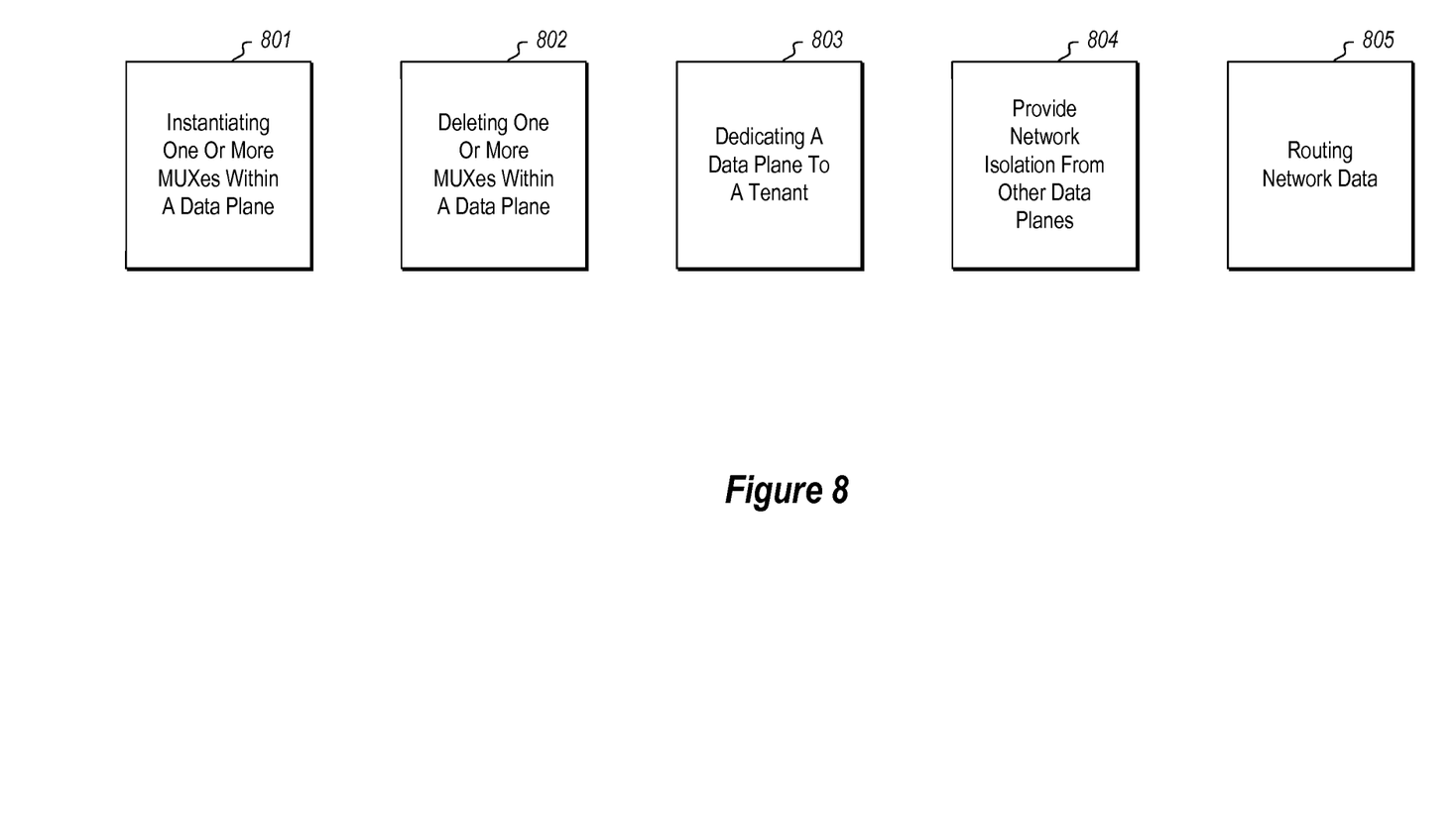
FIG. 8 illustrates the functions that a data plane is capable of performing when under the direction of a control plane.

Returning back to FIG. 4, load balancer 420 is shown as having a first data plane 422A, a second data plane 422B, and so forth. In this section, an example structure and functionality of one of the data planes, data plane 422A, will be described. Though data plane 422A will be used as the example object, the principles described in this next section are equally applicable to each of the other data planes (e.g. data planes 422B through 422D). That being said, FIGS. 7 and 8 will be used to introduce those principles. By way of introduction, FIG. 7 illustrates a detailed view of a data plane 700 that contains an adjustable number of MUXes. FIG. 8 illustrates the functions that data plane 700 can perform when under the direction of a control plane.

As indicated, FIG. 7 illustrates a detailed view of a data plane 700. Data plane 700 may be configured in the same manner as the data plane 422A that was presented in FIG. 4. As such, the structures and functionality described with respect to data plane 700 may be applied to data plane 422A. FIG. 7 further demonstrates that data plane 700 may have an adjustable number MUXes. For example, data plane 700 has MUX 702A, MUX 702B, and MUX 702C. Collectively, these are referred to as MUX Pool 702. Ellipses 702D demonstrate that the number of MUXes are not limited to the number of MUXes illustrated in FIG. 7. Also, at least some, and potentially all, of the MUXes within MUX Pool 702 are configured in an identical manner and operate in an identical way. In other words, all of the MUXes within a single data plane are configured identically. And then to further clarify, a configuration of MUXes within a first data plane are different from a configuration of MUXes within a second data plane. Consequently, each data plane within a load balancer has a unique configuration.

FIG. 8 will now be used to illustrate the functionalities of data plane 700. Again, the principles described herein can relate to any data plane operating within a load balancer.

As shown in FIG. 8, data plane 700 may perform a variety of different functions. However, the data plane 700 may perform these functions when directed to do so by a control plane (e.g. control plane 421 in FIG. 4). In this regard, a control plane determines when certain changes or functions are to be made (e.g. act 603 in FIG. 6), not the data plane. To resume, data plane 700 is capable of instantiating (act 801) one or more new MUXes (e.g. MUX 702A in FIG. 7) within itself. In a similar manner, data plane 700 is capable of deleting (act 802) one or more MUXes (e.g. MUX 702A in FIG. 7) within itself. Data plane 700 is also capable of dedicating (act 803) its services to a particular tenant or group of tenants (e.g. tenant 410B in FIG. 4). In other words, data plane 700 may deny passage for network data that is addressed to a foreign tenant. To further clarify, each data plane within a load balancer is capable of dedicating its services to a particular tenant or group of tenants; as a result, a first data plane may be dedicated to a first tenant and a second data plane may be dedicated to a second tenant.

Data plane 700 is further capable of providing isolation (act 804) between packets of network data (e.g. network data 435 in FIG. 4) that are passing through the load balancer in which data plane 700 is located. For example, a data plane that is dedicated to a particular tenant is capable of isolating any network data that is addressed to that tenant from all the other network data that is also passing through the load balancer. In other words, data plane 700 is capable of providing network data isolation between the various data planes. Additionally, data plane 700 is capable of rerouting (act 805) network data after a data plane has been deleted. In a similar manner, data plane 700 is also capable of rerouting network data after a new data plane has been added. Stated differently, data plane 700 is very flexible in that existing routing paths may be readily reassigned.

The preceding discussion focused on the functionality and structure of load balancer 420. To recap, control plane 421 was presented in detail using FIGS. 5 and 6, and data plane 422A was presented in detail using FIGS. 7 and 8. In this next section, the operational flexibility of control plane 421 and data plane 422A will be described.

Returning to FIG. 4, control plane 421 and data plane 422 are shown. Here, control plane 421 is presented as having a first partition 421A, a second partition 421B, and so forth. Likewise, data plane 422 is presented as having a first data plane 422A, a second data plane 422B, and so forth.

In this case, the first partition 421A is serving as a primary control (see association 423) for the first data plane 422A. The second partition 421B is serving as a primary control (see association 426) for the second data plane 422B. In addition to serving as a primary control, the first partition 421A is also serving as a backup control (see association 424) for the second data plane 422B. Likewise, the second partition 421B, in addition to serving as a primary control, is also serving as a backup control (see association 425) for the first data plane 422A. Here, each partition of the control plane is serving as a primary control for a specific data plane and as a backup control for a different data plane. Accordingly, if one of the control planes should fail, there is greater resiliency in the functionality of the load balancer.

Control plane 421 (and each partition therein) is also capable of performing other functions. Specifically, control plane 421 is capable of directly programming one or more data planes 422. To illustrate one example of programming, control plane 421 can announce new network routes. Control plane 421 is also capable of monitoring the health of the data planes 422 within load balancer 420. Additionally, control plane 421 is capable of monitoring the health of MUXes within a set of data planes. Furthermore, control plane 421 is capable of monitoring the health of the tenants 410 that are being load balanced.

As recounted previously, this next section will discuss the operational flexibility of the data planes 422. Relating back to FIG. 4, FIG. 4 again illustrates load balancer 420 as having a first data plane 422A, a second data plane 422B, and so forth. This collection of data planes is referred to as data planes 422. The operational flexibility described hereafter is applicable to all of the data planes operating within the load balancer 420 and is not limited to only a single data plane.

Using data plane 422A as an example, data plane 422A can be used to sink network data for a tenant address (e.g. tenant address 415A) that is undergoing a denial of service attack. Further, the number of MUXes (e.g. MUX 702A residing in Data Plane 700 in FIG. 7) within data plane 422A can be selected based on an expected load or throughput; as such, the number of MUXes is adjustable. Data plane 422A can also be used to filter network data (e.g. network data 435) that is destined for a specific tenant address (e.g. tenant address 415B). Additionally, data plane 422A can be used to encrypt network data. Another example of flexibility is that data plane 422A can be used to disassemble and/or reassemble information in a packet of network data (e.g. network data 435). As stated, these principles relate to all of the data planes within a load balancer and not just to data plane 422A.

Figure 9:
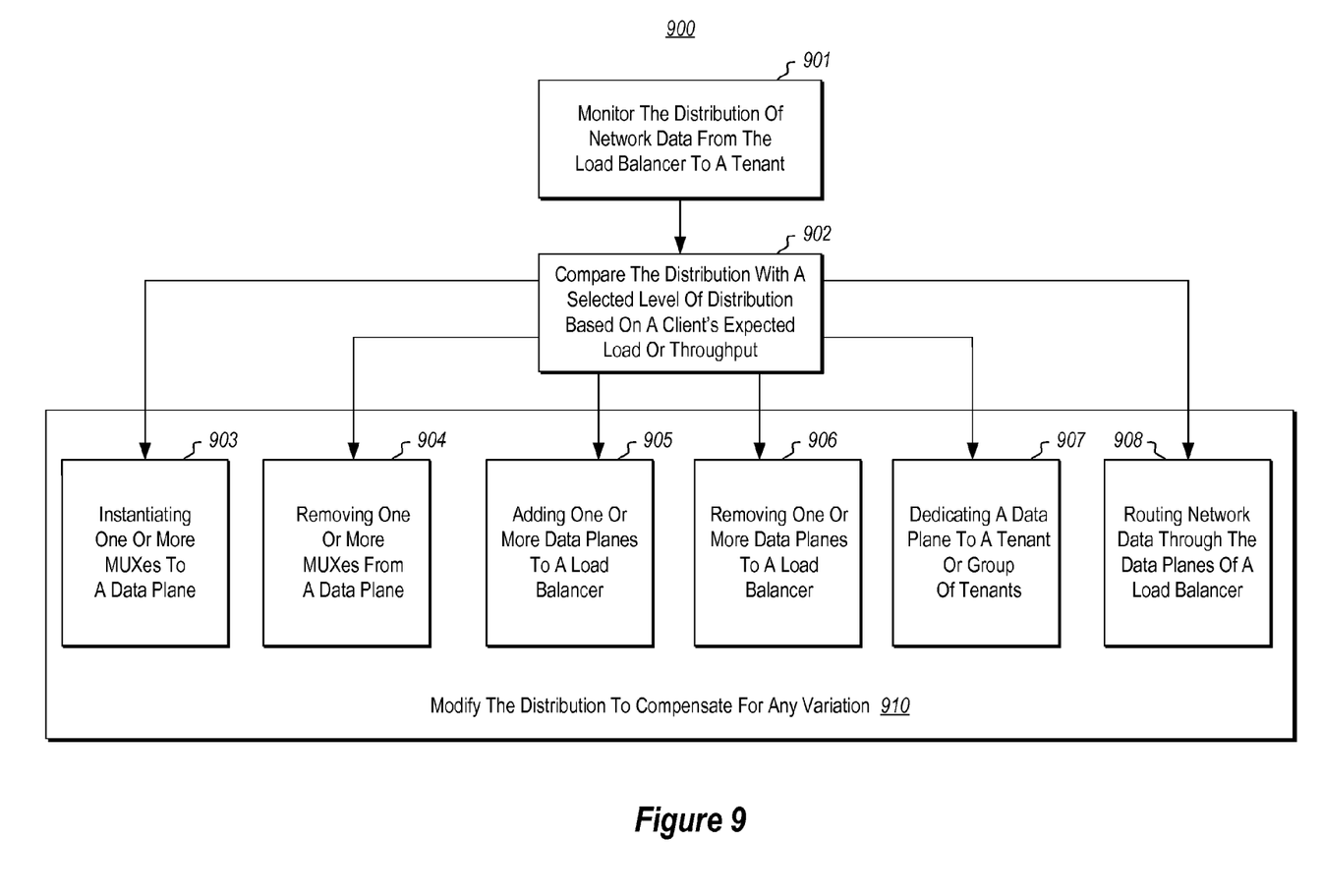
FIG. 9 illustrates a flowchart of an example method for a load balancer that is capable of modifying a distribution of network data.

FIG. 9 illustrate a flowchart that depicts an example method 900 for a load balancer that is capable of modifying a distribution of network data. The method 900 described in FIG. 9 may be implemented by the load balancer 420 that was described in FIG. 4. Also, in order to implement method 900, a load balancer will need to be configured in a similar manner as the load balancer 420 in FIG. 4.

Method 900 includes of an act 901 of monitoring a measurement of the distribution of network data that is imposed by the load balancer. In other words, the amount of network data that passes through the load balancer for any given tenant is capable of being measured. By way of example, this act could correspond to measuring the amount of network traffic that is passing through the data plane 422A that was shown in FIG. 4.

Subsequently, an act 902 is performed in which the measurement that was acquired in the previous act is then compared with a selected distribution. Stated differently, the amount of data that is actually passing through the load balancer for any given tenant is compared against a desired, or selected, amount. By way of example, this act would correspond to comparing the actual amount of network traffic that is passing through data plane 422A with a set amount (e.g. a goal level or a desired metric level), of network data passing through data plane 422A.

The following acts, acts 903 through 908, are all performed after the acts that were just described. However, acts 903-908 may all be performed in parallel with each other. Acts 903 through 908, collectively or independently, can be described generally as an act (act 910) that modifies how a load balancer distributes network data to a tenant or group of tenants. This modification is performed in order to compensate for any variations that exist between the measured distribution and the selected distribution that were collected and compared in the previous steps.

Specifically, method 900 includes an act 903 in which one or more MUXes are capable of being added to a data plane. Here, act 903 may correspond to act 801 in FIG. 8 in which a control plane is capable of instantiating one or more MUXes within a data plane. Similarly, method 900 also includes an act 904 in which one or more MUXes are capable of being removed from a data plane. Act 904 corresponds to act 802 in FIG. 8 in which a control plane is capable of deleting one or more MUXes within a data plane.

Method 900 further includes an act 905 in which one or more data planes is/are capable of being added to a load balancer. Here, each of the newly added data planes have one or more MUXes. Act 905 corresponds to act 601 in FIG. 6 in which a control plane is capable of instantiating one or more data planes. In a similar manner, method 900 also includes an act 906 in which one or more data planes is/are capable of being removed from a load balancer. Act 906 corresponds to act 602 in FIG. 6 in which a control plane is capable of deleting one or more data planes.

Method 900 also includes an act 907 in which a data plane that is operating as part of a load balancer is capable of being dedicated to a tenant or group of tenants. Act 907 corresponds to act 803 in FIG. 8 in which a data plane is dedicated to a tenant. On a similar note, method 900 also includes an act 908 in which network data that is addressed to a tenant or group of tenants is capable of being routed or rerouted through a set of data planes. Act 908 corresponds to act 805 in FIG. 8 in which network data is routed through a data plane.

To summarize, in a cloud computing environment, customers use shared services offered by the cloud provider. One such service is load balancing. However, multiple customers may share the same load balancing service. It follows then that different customers may have different load balancing needs. In particular, some customers may desire a load balancer that is capable of isolating their network traffic from the network traffic of other customers. The embodiments described herein proposes a scalable, manageable way of offering a unique load balancing service in a cloud computing environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, the system comprising:
   one or more tenants, each tenant or group of tenants having a tenant address;
   a source configured to receive one or more network data destined for one or more tenant addresses assigned to a tenant or group of tenants; and
   a load balancer configured to receive the one or more network data from the source and to distribute the one or more network data to the tenant address assigned to the tenant or group of tenants, the load balancer being in the data flow path of the one or more network data, the load balancer comprising:
      a control plane, the control plane being configured to perform one or more of the following acts:
         an act of instantiating one or more data planes;
         an act of deleting one or more data planes; and
         an act of determining when changes are to be made to one or more data planes within a plurality of data planes; and
      the plurality of data planes, the plurality of data planes including a first data plane and a second data plane, the first and second data planes each having a plurality of multiplexers (MUXes), wherein one or both of the first or second data planes performs two or more of the following acts when the control plane determines that a change is to be made:
         an act of instantiating one or more MUXes within at least one of the first or second data planes;
         an act of destroying one or more MUXes from within at least one of the first or second data planes;
         an act of dedicating the first data plane to a first tenant or group of tenants; and
         an act of dedicating the second data plane to a second tenant or group of tenants, wherein the first and second data plane provide network data isolation from each other.

2. The system in accordance with claim 1, wherein the plurality of MUXes within at least one of the first and second data planes are configured identically.

3. The system in accordance with claim 1, wherein the control plane comprises a first partition and a second partition, the first partition serving as a primary control for the first data plane and the second partition serving as a backup control for the first data plane, the first partition further serving as a backup control for the second data plane and the second partition further serving as the primary control for the second data plane.

4. The system in accordance with claim 1, wherein the source is an edge router.

5. The system in accordance with claim 1, wherein the tenant address includes a virtual IP (VIP) address.

6. The system in accordance with claim 1, wherein the first data plane may be used to sink network data for a tenant address subject to a denial of service attack.

7. The system in accordance with claim 1, wherein the number of MUXes in the first data plane is selected based on an expected load or throughput.

8. The system in accordance with claim 1, wherein the system is in a cloud computing environment.

9. The system in accordance with claim 1, wherein the system is in a distributed environment.

10. A method for a load balancer to modify a distribution of network data, the load balancer comprising a data plane having one or more multiplexers (MUXes), the data plane corresponding to a tenant or group of tenants, the corresponding data plane being placed in a data path of network data being transmitted from one or more sources to one or more tenant addresses of the corresponding tenant or group of tenants, the method comprising:
   an act of monitoring a measurement of the distribution of the network data imposed by the load balancer in delivering the network data through the corresponding data plane to the tenant or group of tenants;
   an act of comparing the measurement of the distribution of the network data imposed by the load balancer via the corresponding data plane with a selected distribution selected to be imposed by the load balancer in delivering the network data via the corresponding data plane to the tenant or group of tenants; and
   an act of modifying the distribution of the network data imposed by the load balancer in delivering network data via the corresponding data plane to the tenant or group of tenants to compensate for at least some variation between the compared distributions of the network data by adding one or more MUXes or removing one or more MUXes to the corresponding data plane.

11. The method in accordance with claim 10, wherein the tenant address includes a virtual IP (VIP) Address.

12. The method in accordance with claim 10, wherein the one or more MUXes within the corresponding data plane are configured identically.

13. The method in accordance with claim 10, wherein the source is an edge router.

14. The method in accordance with claim 10, wherein the tenant address includes a VIP address.

15. The method in accordance with claim 10, wherein the load balancer further includes a control plane, the control plane comprising a first partition and a second partition, the first partition serving as a primary control for a first data plane and the second partition serving as a backup control for the first data plane, the first partition further serving as a backup control for a second data plane and the second partition further serving as the primary control for the second data plane.

16. A method for a load balancer to modify a distribution of network data, the load balancer comprising one or more data planes each having one or more multiplexers (MUXes), at least one of the one or more data plane corresponding to a tenant or group of tenants, the corresponding data plane being placed in a data path of network data being transmitted from one or more sources to one or more tenant addresses of the corresponding tenant or group of tenants, the method comprising:

an act of adding one or more data planes to the load balancer, each of the one or more data planes having one or more MUXes;

and act of removing one or more data planes from the load balancer, each of the one or more data planes having one or more MUXes;

an act of dedicating the added one or more data planes to a tenant or group of tenants; and an act of routing a network data destined for the tenant or group of tenants through the newly added one or more data planes.

17. The method in accordance with claim 16, wherein the load balancer further includes a control plane, the control plane programming the one or more data planes, the control plane having a first partition and a second partition, the first partition serving as a primary control for a first data plane and the second partition serving as a backup control for the first data plane, the first partition further serving as a backup control for a second data plane and the second partition further serving as the primary control for the second data plane.

18. The method in accordance with claim 17, wherein the control plane performs one or more of the following acts:

an act of monitoring the health of the data plane;

an act of monitoring the health the MUXes within the one or more data planes; and an act of monitoring the health of the tenant or group of tenants being load balanced.

19. The method in accordance with claim 17, wherein the control plane programs the one or more data planes to announce network routes.

20. The method in accordance with claim 16, wherein the first data plane may be used to filter network data for a tenant address.

* * * * *